United States Patent [19]

Oyama et al.

[11] 4,021,609
[45] May 3, 1977

[54] SYSTEM FOR REGENERATING A DATA FROM A BURST SIGNAL WHICH IS RECEIVED AND PROCESSING SAID DATA WITH A LOCAL CLOCK AND THE CIRCUIT FOR CARRYING OUT THE SAME

[75] Inventors: Mitsukazu Oyama; Yoshiro Tada, both of Kawasaki; Yasuhiko Sakamoto, Fujisawa, all of Japan

[73] Assignee: Fujitsu Ltd., Japan

[22] Filed: Aug. 20, 1975

[21] Appl. No.: 606,065

[30] Foreign Application Priority Data
Aug. 30, 1974  Japan .............................. 49-99599

[52] U.S. Cl. .................................. 178/69.1; 325/4
[51] Int. Cl.² ...................... H04L 7/00; H04B 7/185
[58] Field of Search .............. 178/69.5 R; 343/175, 343/176, 178, 179, 204; 179/15 BS, 15 A, 15 BA; 325/4

[56] References Cited
UNITED STATES PATENTS

| 3,729,717 | 4/1973 | deKoe | 179/15 BS X |
| 3,825,899 | 7/1974 | Haeberle | 179/15 BS X |

*Primary Examiner*—Robert L. Griffin
*Assistant Examiner*—Michael A. Masinick
*Attorney, Agent, or Firm*—Staas & Halsey

[57] ABSTRACT

In the receiving terminal of a PCM (Pulse Code Modulation)-TDMA (Time Division Multiple Access) system, a data is demodulated from a received burst signal, said data is written in a buffer register by using a burst clock which is regenerated from the received burst signal. The content of said buffer register is read by using a local clock which is generated in the receiving office and, after the data is read out, said data is controlled by said local clock.

5 Claims, 10 Drawing Figures

—— MAIN SIGNAL PATHS
----- MAIN CONTROL LINES

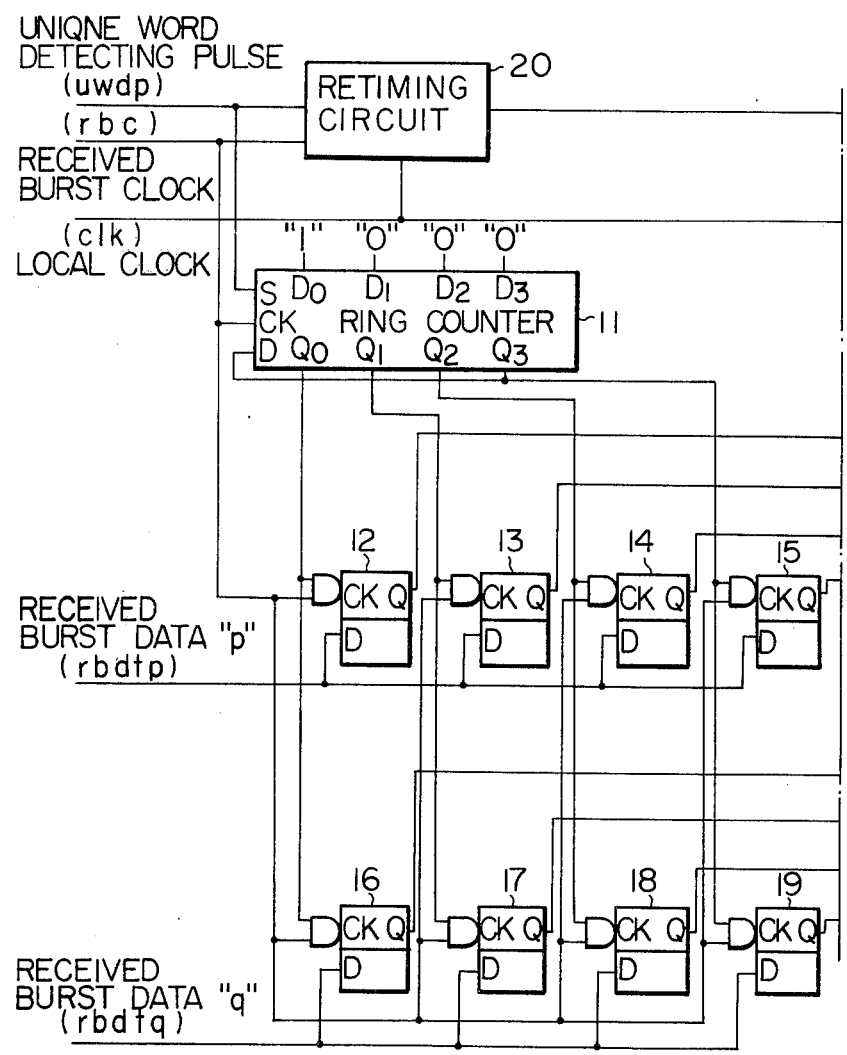

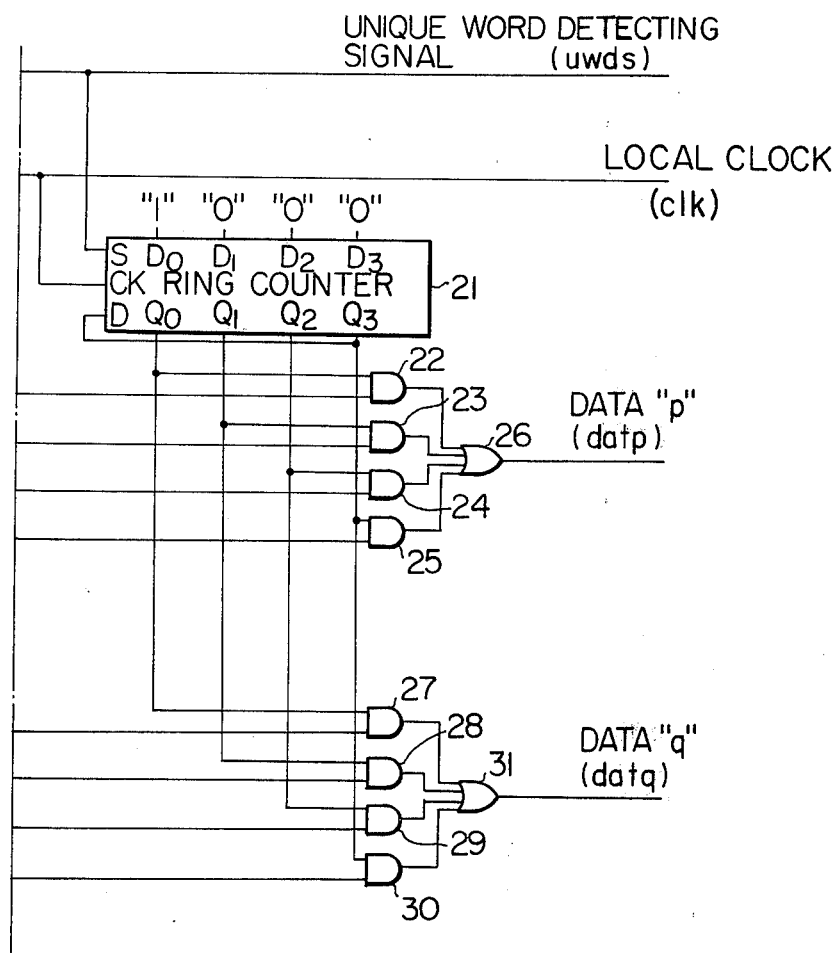

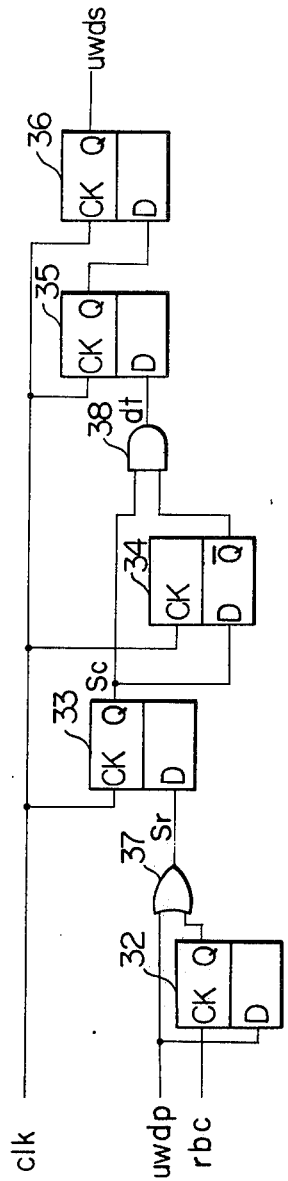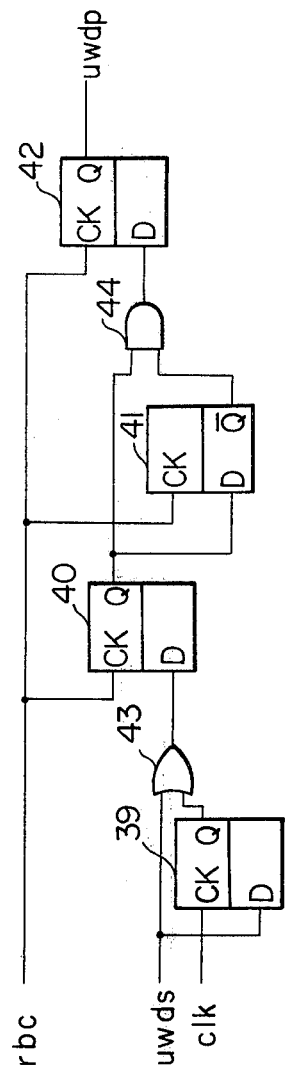

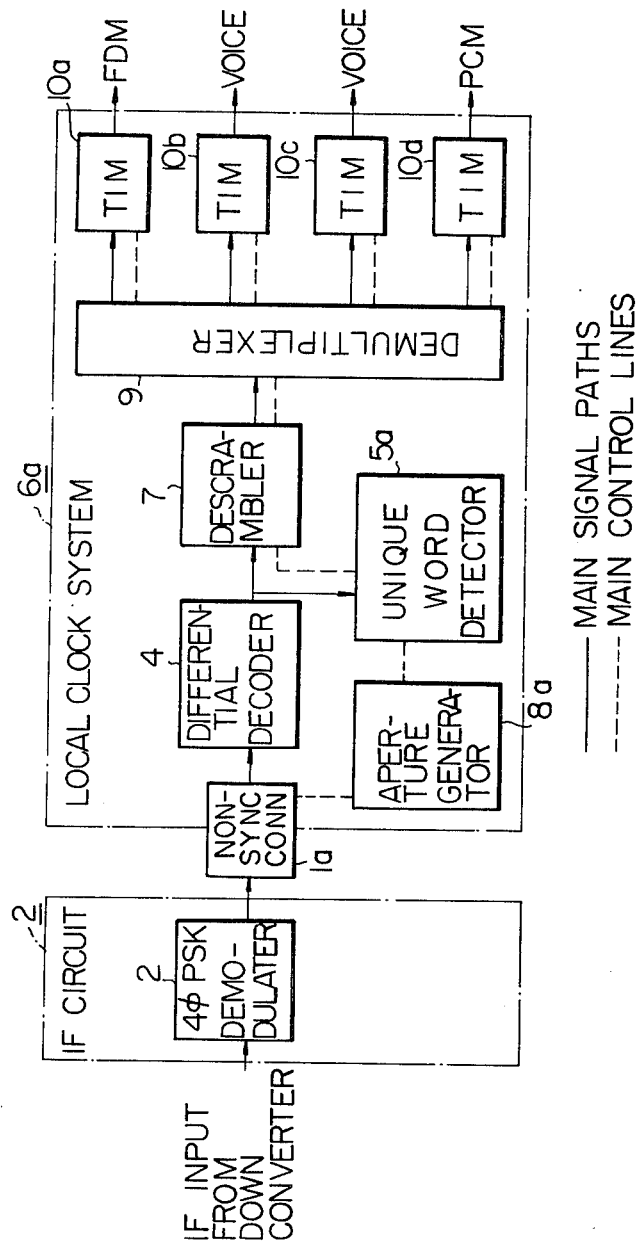

SYSTEM FOR REGENERATING A DATA FROM A BURST SIGNAL WHICH IS RECEIVED AND PROCESSING SAID DATA WITH A LOCAL CLOCK AND THE CIRCUIT FOR CARRYING OUT THE SAME

DETAILED EXPLANATION OF THE INVENTION

The present invention relates to a system for regenerating a data from a burst signal which is received in a receiving terminal and processing said data by using a local clock pulse which is generated in said receiving terminal and an apparatus for carrying out the same. Specifically, the present invention relates to a system and a circuit in a PCM-TDMA system for, after demodulating a data from a received burst signal, processing said data by using said local clock.

In the PCM-TDMA system which is used in a satellite communication system, for example, a receiving terminal can receive burst signals which are sent from the other terminals. The sending terminals send the burst signals in a time slot within one frame. In the receiving terminal, a local clock signal is regenerated for demodulating and processing the burst signal and the receiving burst data is demodulated by using said local clock signal. However, said local clock can only be regenerated during the period when the burst signal is being received. Therefore, for the purpose of processing the received burst data in the receiving terminal, a pseudo clock which is synchronized with a received burst clock which is regenerated from the burst signal should be generated after said received burst clock disappears. For the purpose of generating the pseudo clock, a sample hold type phase synchronization loop circuit which is synchronized with the received burst clock is conventionally used. However, this convenitonal method has the drawbacks shown below.

1. Since each burst clock has different clock phase, when one phase synchronization loop circuit is used, errors can be produced in the data process of the burst data. Therefore, for the purpose of processing a plurality of received burst signals, two methods can be considered. First, there is a method (a) which is provided with phase synchronization loop circuits for every received burst signal and secondly, a method (b) which processes alternate burst signals using two phase synchronization loop circuits. However, in method (a), when the number of received burst signals increases, phase synchronization loop circuits in accordance with the number of burst signals received must be provided. Therefore, the amount of hardware in the receiving portion must be increased and the cost of the receiving portion thus increases, also. With regard to method (b), the control operation becomes complicated.

2. Due to unstable elements included in the phase synchronization loop circuit, a jitter is generated in the clock signal and errors can occur during the regeneration and the processing of the data.

The object of the present invention is to provide a novel method which removes the above-mentioned drawbacks, and which processes the received burst data by changing the received burst clock into a local clock so as to simplify the construction of the system. For achieving the above-mentioned object, according to the present invention, the receiving terminal in the PCM-TDMA system writes the demodulated data from the received burst signal into the buffer register. Said receiving terminal reads the content of the buffer register by using the local clock and said receiving terminal controls the data which is read from the buffer register by using said local clock.

Further features and advantages of the present invention will be apparent from the ensuing description with reference to the accompanying drawings to which, however, the scope of the invention is in no way limited.

FIGS. 1A – 1C respectively show a burst signal, a received burst clock signal and a received burst data in the receiving office of the PCM-TDMA system;

FIGS. 3A and 3B are block diagrams of one embodiment of the system according to the present invention;

FIG. 5 is one example of a retiming circuit of the block diagram shown in FIG. 3;

FIG. 6 is a block diagram of another embodiment of the receiving office in the PCM-TDMA system which constitutes the peripheral circuit of the system of the present invention;

FIG. 7 is one example of a retiming circuit of the block diagram shown in FIG. 6.

Figure 1:
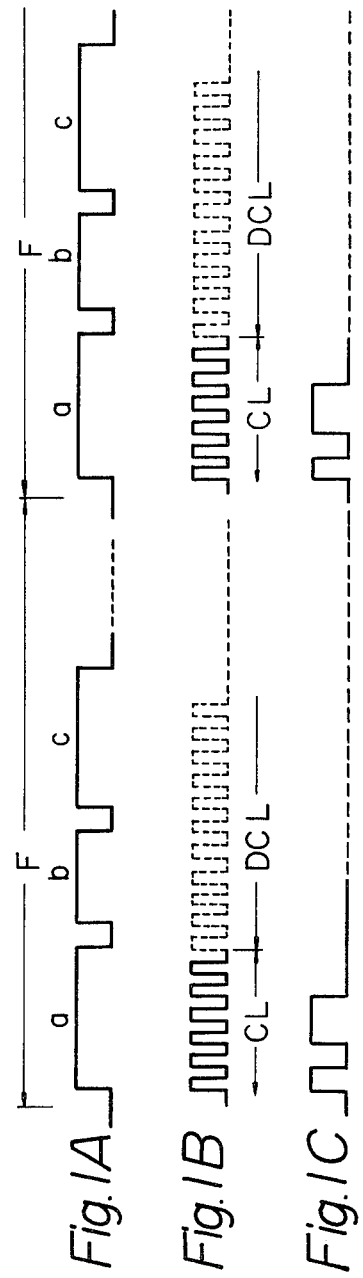

As shown in FIG. 1A, in a PCM-TMDA system which is used in a satellite communication system, for example, a receiving terminal can receive burst signals $a$, $b$, $c$, .... which are sent from the other terminals. The sending terminals send the burst signal in a time slot within one frame F. In the receiving terminal a local clock signal is regenerated in order to demodulate and process the burst signal, and the received burst data is demodulated by using said local clock signal. For example, as shown in FIG. 1B, a received burst clock CL is regenerated with respect to the burst signal $a$ shown in FIG. 1A and the data of the received burst signal is processed by said received burst clock CL as shown in FIG. 1C. However, said local clock CL can only be regenerated during the period when the burst signal is being received. Therefore, for the purpose of processing the received burst data in the receiving terminal, a pseudo clock DCL which is synchronized with the received burst clock CL should be generated after said received burst clock CL disappears. For the purpose of generating said pseudo clock DCL, a sample hold type phase synchronization loop circuit is conventionally used. However, this conventional method has the above-mentioned drawbacks.

A detailed explanation concerning embodiments of the system according to the present invention, will now be given.

Figure 2:
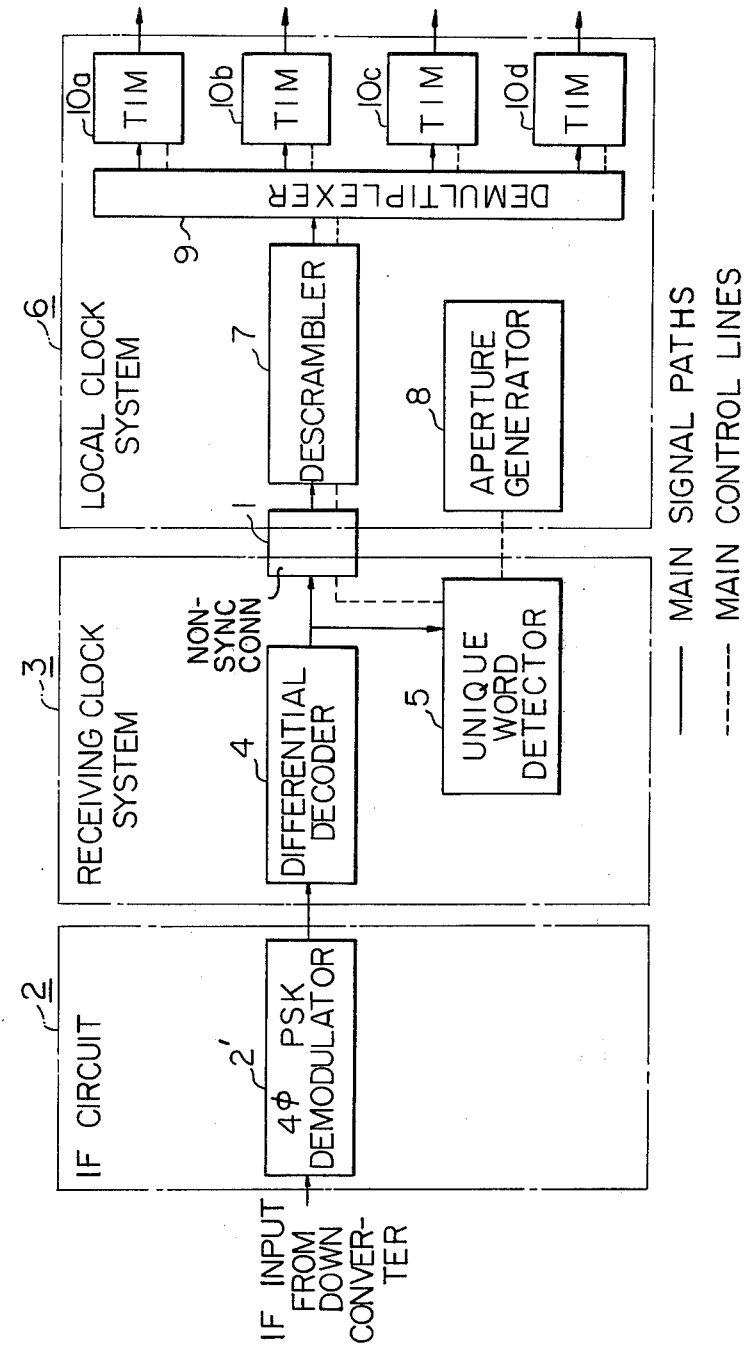
FIG. 2 is a block diagram of one embodiment of the receiving office in the PCM-TDMA system constituting the peripheral circuit of the system of the present invention.

FIG. 2 is a block diagram of one embodiment of the receiving terminal in the PCM-TDMA system which constitutes the peripheral circuit of the system of the present invention. Block 1 in FIG. 2 is a non-synchronized connecting circuit according to the system of the present invention. Referring to FIG. 2, IF circuit 2 is composed of a four-phase shift keying circuit (4 $\phi$ PSK circuit) 2' which receives the IF input signal from a down converter and sends the four phase PSK demodulated signal to a receiving clock system 3 which is composed of a differential decoder 4 and a unique word detector 5. Said receiving clock system 3 can be operated by the received burst clock. The output of the receiving clock system 3 is supplied via the non-synchronized connecting circuit 1 to a local clock system 6. The local clock system 6 is composed of a descrambler 7 which is connected to the circuit 1, a demultiplexer 9 which is connected to the output of the descrambler 7 and to the terrestrial interface modules (TIM's) 10a 10b, 10c and 10d. These elements composing the local clock system 6 and an aperture generator 8 are operated by the local clock. In FIG. 2, connections by solid lines show the main signal paths and connections by dotted lines show the main control lines. The system according to the present invention has the function of being the interface between the receive clock system 3 and the local clock system 6 in FIG. 2.

Next, the non-synchronized connecting circuit 1 will be explained. Referring to FIG. 3, received burst clock (rbc) is supplied from a clock recovery circuit which is provided in the four phase PSK demodulator 2 shown in FIG. 2. It is necessary to use only one clock recovery circuit for all of the burst signals. This clock recovery circuit does not need a sample hold type phase synchronization loop circuit as is required by the conventional arts. Instead, the clock recovery circuit of the present invention is composed of a well-known phase synchronization loop or a simple narrow band-pass filter.

Referring to FIGS. 3A and 3B, received burst data $p$ and $q$ (rbdtp and rbdtq) are serial data concerning two sequences $p$ and $q$. Said two sequences $p$ and $q$ are used because the block diagram shown in FIGS. 3A and 3B is related to the PCM-TDMA system using a four phase PSK signal. Therefore, when the PSK signal in the system is 2 $\phi$ PSK or more than 8 $\phi$ PSK, it goes without saying that the received burst data is composed of one sequence or more than three sequences in accordance with the phase of the PSK signal. In any case, the non-synchronized connection of the received burst data can be treated in parallel and independently from each sequence. Thereinafter, only one sequence (rbdtp), will be explained, for the sake of brevity.

Figure 4:
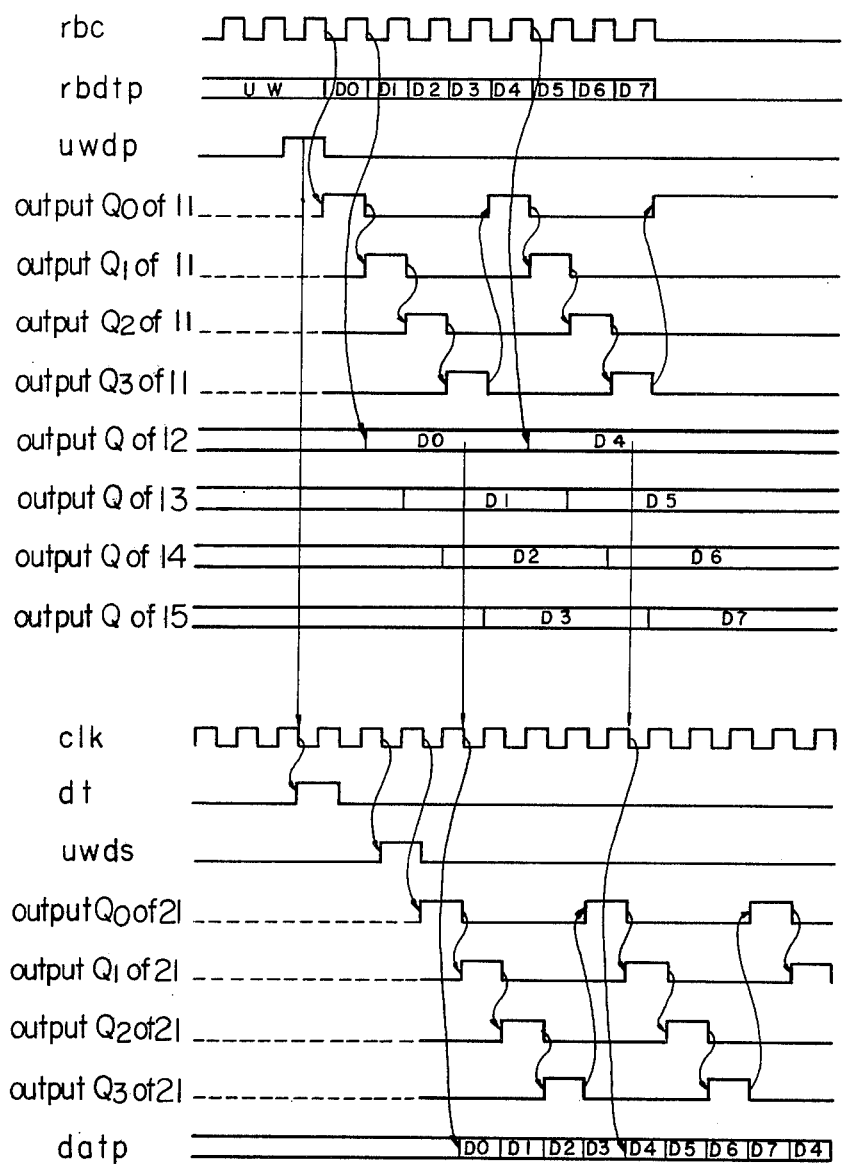
FIG. 4 shows the waveforms of essential parts of the block diagram shown in FIG. 3.

A unique word detecting pulse (uwdp) is a pulse which is generated when a unique word is regenerated from the received burst signal, and this unique word detecting pulse is supplied from the unique word detector 5 (shown in FIG. 2) which is operated by the received burst clock, to the circuit shown in FIG. 3A. The unique word is positioned between a synchronizing word and the front portion of a burst signal, that is, before the data signal, and the phase of the front portion of burst signal can be learned by detecting said unique word. FIG. 4 shows an example wherein an eight bit data signal follows the unique word.

A lock clock (clk) is supplied from the oscillator which is provided in the receiving terminal. The frequencies of the local clock (clk) and that of the received burst clock (rbc) are nearly equal. However, the phases of the local clock (clk) and the received burst clock (rbc) are not synchronized with each other.

Referring to FIG. 3B, the unique word detecting signal (uwds) is formed by retiming the unique word detecting pulse (uwdp) using the local clock (clk). Said signal (uwds) is synchronized with the local clock (clk).

Referring to FIG. 3A and 3B, ring counters 11 and 21 are composed of shift registers. When a signal 1 is applied to an input terminal S, signals 1, 0, 0 and 0 are respectively supplied to terminals $D_0$, $D_1$, $D_2$ and $D_3$.

All flipflops 12 through 15 and 16 through 19 are D-type flip-flop circuits. Two inputs are supplied via an AND circuit to the input terminal of each flip-flops. Therefore, the clock inputs of these flip-flop circuits 12 through 15 and 16 through 19 are controlled by the outputs $Q_0$, $Q_1$, and $Q_2$ and $Q_3$ of the ring counters 11, and the signal (rbdtp) is written in the buffer register in the order shown in FIG. 4. Referring to FIG. 4, although only one sequence of the signal (rbdtp) is shown, it goes without saying that the same operation is carried out with respect to the signal (rbdtq).

Retiming circuit 20 retimes the unique word detecting pulse (uwdp) which is synchronized with the receiving burst clock (rbc) by the local clock (clk) with the time relation shown in FIG. 4, and said retiming circuit 20 generates the unique word detecting signal (uwds) which is synchronized with the local clock (clk). One example of the retiming circuit 20 is shown in FIG. 5. Referring to FIG. 5, the signal (uwdp) is delayed one bit by a D-type flip-flop 32, and the original signal (uwdp) and the delayed signal are supplied to an $\overline{OR}$ gate 37 so as to convert said signal (uwdp) to a signal Sr having a two symbol width (which corresponds to two clock periods), and said signal Sr is supplied to a D-type flip-flop 33. As the D-type flip-flop 33 is operated by the local clock (clk), the output of said D-type flip-flop 33 becomes a signal Sc which is synchronized with the local clock and has a two symbol width. However, it is possible for the width of said signal Sc to have a one symbol width or a three symbol width in accordance with the frequency difference or the phase relation between the clocks (clk) and (rbc). This signal Sc is delayed one bit by the flip-flop 34, and the output of the flip-flop 34 and said signal Sc are supplied to an AND gate 38, the output of which becomes a signal dt having a one symbol width (which corresponds to one period of the clock). This output signal dt is delayed two bits by passing through D-type flip-flops 35 and 36 and the output of the D-type flip-flops becomes a signal (uwds).

Returning to FIG. 3B, AND gates 22 through 25 and 27 through 30 are selected and controlled by ring counter 21. The outputs of these AND gates read the output of the buffer registers 12 through 15 and 16 through 19 via $\overline{OR}$ gates 26 and 31 with the time relation shown in FIG. 4, and the data (datp) and (datq) are produced at the output terminals of the $\overline{OR}$ gates 21 and 31 respectively.

In the non-synchronized connection system according to the present invention, a constant relationship should be maintained between the phase of the data (datp) which is synchronized with the local clock (clk), and the phase of the signal (uwds). Therefore, in order to satisfy the above relation, several bits are required in the buffer register. When the number of bits in the buffer register is N, the reading phase must be delayed by a value included within the symbols O − N. When we assume that the delay of the phase which reads the register is rd, the value of the delay can be expressed by the following equation:

$$(rd) = (uwdpd) + (brd) + (jd) + (fd) + (sd) + (hd)$$

In the above-equation, (uwpd) is delay of the signal (uwds) with respect to the signal (uwdp), and (brd) is the value of a propagation delay of a signal which passes through the buffer register and the select gates. Said (brd) is estimated to be equivalent to the advance of the reading phase. A delay (jd) is due to the jitter phenomenon of the clock (clk). And the delay (fd) is due to a drift between the writing phase and the reading phase. Said delay (fd) is caused by the frequency difference between the clock (clk) and the local clock. A delay (Sd) is a set time required in the input of the flip-flops which are not shown and said delay (sd) is the same as the advance of the reading phase. Similarly, a delay (hd) is a hold time which is required in the input of the flip-flops which are not shown and said delay (hd) is the same as the lag of the reading phase. When we assume that high frequency ECL IC is used, that the clock rate is 60MHZ, that the repetition period of the burst signal is 750 μS and that the maximum frequency difference between the signals (rbc) and (clk) is 10, the following approximate values of the above-mentioned delay's are true.

$$(sd) = 2 \pm 2 \text{ (ns)}$$

$$(hd) = +0.5 \pm 1 \text{ (ns)}$$

$$(fd) = \pm 0.1 \text{ (ns)}$$

$$(jd) = \pm 0.2 \text{ (ns)}$$

$$(brd) = -7 \pm 3.5 \text{ (ns)}$$

$$(uwdpd) = +45 \pm 10 \text{ (ns)}$$

Therefore, $(rd) = +36.5 \pm 16.8$ (ns)

Therefore, when N = 4 is selected as shown in our embodiment, it is understood that there is a sufficient margin of the value of the delay (rd) between O and N symbols. Also, in the embodiment, shown in FIG. 5 two stages of D-type flip-flops 35 and 36 are used and the delay of the signal (uwds) with respect to the signal (dt) is selected to be two bits. When we change the number of stages of said D-type flip-flops, the value of the delay (uwdpd) can be changed by a symbol unit. When the reading phase should be adjusted using a value smaller than the width of the symbol, the adjustment of the reading phase can be carried out delaying the output (Sr) so as to delay (uwdpd) or by inserting a delay line at the output of the buffer register so as to advance the delay (brd).

As mentioned above, the present invention relates to an operation based on the timing chart shown in FIG. 4. However, many circuits for carrying out the same exist. For example, the whole circuit can be constructed with counters having a modulo N which is used in place of the ring counters, demultiplexers and multiplexers. The flip-flops 35 and 36 can also be positioned in front of the retiming circuit, and the flip-flops 35 and 36 can be removed by delaying the phase which sets up the ring counter 11 by two bits.

Further, in the aforementioned embodiment, the non-synchronized connecting circuit 1 according to the present invention is placed between the differential decoder 4 and the descrambler 7 as shown in FIG. 2. However, it is also possible as shown in FIG. 6, for said non-synchronized connecting circuit 1a to be placed before the differential decoder 4 and all of the PCM-TDMA terminals can be operated by the local clock. In this case, the circuit shown in FIG. 3 can also be used with only slight changes. That is, the signal (uwds) is supplied from the aperture generator 8a to the non-synchronized connecting circuit 1a as a timing signal prior to the unique word. The circuit shown in FIG. 7 is used as the retiming circuit 20. In the circuit shown in FIG. 7, the signal (uwds) and the pulse (uwdp) in FIG. 5, and also the local clock (clk) and the receiving burst clock (rbc) shown in FIG. 5 are exchanged with each other, and the flip-flop 36 in FIG. 5 is removed. The functions of the D-type flip-flops OR gate and AND gates in FIG. 7 are the same as those shown in FIG. 5.

As mentioned above, the receiving terminal which receives the burst signal in the PCM-TDMA system and processes the received data, according to the present invention, the received burst clock is exchanged via the buffer register with the local clock and the received burst data in the receiving terminal can be processed by the local clock. Therefore, the construction according to the present invention becomes simpler than that of the prior system where the phase synchronization loops are provided for every received burst signals, or compared to another prior system which provides two phase synchronization loops for each burst signal. And, as the precision of the local clock is nearly equal to that of the received burst clock, there are no errors in the process of the received burst data.

What is claimed is:

1. A data processing system in a receiving terminal of a PCM-TDMA system which receives a burst data signal, regenerates a burst clock from said burst data signal, and demodulates and processes said burst data signal to recover data and a unique word positioned before said data, recovery of said unique word being indicated by generation of a unique word detecting output synchronized with said burst clock, at least a part of said processing of said burst data signal being performed by means of a local clock haing a phase which is not synchronized with said burst clock, comprising:

a buffer register;

a first ring counter which is initially set by said unique word detecting output, said first ring counter being operated by said burst clock regenerated from said burst data signal to produce a first output;

a first group of gate circuits connected to said first ring counter and to said buffer register, and which writes said data in said buffer register, in order and in synchronizaion with said burst clock, by using the first output of said first ring counter;

a retiming circuit which receives and retimes, by said local clock, said unique word detecting output synchronized with said burst clock so as to synchronize said unique word detecting output with said local clock and to produce a locally synchronized output;

a second ring counter connected to said retiming circuit, which second ring counter is initially set by the locally synchronized output of said retiming circuit, and which is operated by said local clock to provide a second output; and a second group of gate circuits connected to said buffer register and to said second ring counter, and which reads the content of said buffer register in synchronization with said local clock by using the second output of said second ring counter.

2. A data processing system according to claim 1, wherein said unique word detecting output comprises a unique word detecting pulse, said retiming circuit comprises:

a first flip-flop connected to receive said unique word detecting pulse and said burst clock, and which is operated by said burst clock so as to produce an output which is said unique word detecting pulse delayed by one bit;

an OR gate connected to receive said unique word detecting pulse and the output of said first flip-flop so as to produce an OR output thereof;

a second flip-flop connected to receive said local clock and said OR output so as to produce an output which is the OR output delayed by one-half bit;

a third flip-flop connected to said second flip-flop and to receive said local clock so as to produce on output which is the output of said second flip-flop delayed by one bit and inverted in polarity; and fourth and fifth flip-flops connected to said third flip-flop and to receive said local clock so as to delay the output of said third flip-flop by two bits.

3. A data processing system according to claim 2, wherein said unique word detecting pulse is provided by a unique word detector included in said receiving terminal.

4. A data processing system according to claim 1, wherein said unique word detecting output comprises a unique word detecting signal, said retiming circuit comprises:

a first flip-flop connected to received said unique word detecting signal and said local clock, and which is operated by said local clock so as to delay said unique word detecting signal by one bit;

an OR gate connected to receive said unique word detecting signal and the output of said first flip-flop so as to produce on OR output thereof;

a second flip-flop connected to receive said burst clock and said OR output so as to produce an output which is the OR output delayed by one-half bit;

a third flip-flop connected to said second flip-flop and to receive said burst clock so as to produce an output which is the output of said second flip-flop delayed by one bit and inverted in polarity; and a fourth flip-flop connected to said third flip-flop and to receive said local clock so as to delay the output of said third flip-flop by one bit.

5. A data processing system according to claim 4, wherein said unique word detecting signal is provided by an aperture generator included in said receiving terminal.

* * * * *

UNITED STATES PATENT AND TRADEMARK OFFICE
CERTIFICATE OF CORRECTION

PATENT NO. : 4,021,609

DATED : May 3, 1977

INVENTOR(S) : MITSUKAZU OYAMA et al

It is certified that error appears in the above-identified patent and that said Letters Patent are hereby corrected as shown below:

Column 4, line 21, "$\overline{OR}$" should be --$\overline{OR}$--.
Column 7, line 12, "on" should be --an--.

Signed and Sealed this sixteenth Day of August 1977

[SEAL]

Attest:

RUTH C. MASON
Attesting Officer

C. MARSHALL DANN
Commissioner of Patents and Trademarks